July 3, 1956

R. M. INGHAM, JR 2,752,658

SLASHER BEAM BRAKE

Filed Nov. 26, 1951

INVENTOR.
R. M. INGHAM, JR.
BY
Walter E. Mueller
ATTORNEY

July 3, 1956 R. M. INGHAM, JR 2,752,658
SLASHER BEAM BRAKE
Filed Nov. 26, 1951 2 Sheets-Sheet 2

INVENTOR.
R. M. INGHAM, JR.
BY
Walter E. Mueller
ATTORNEY

United States Patent Office 2,752,658
Patented July 3, 1956

2,752,658

SLASHER BEAM BRAKE

Robert M. Ingham, Jr., Spartanburg, S. C., assignor to Deering Milliken Research Corporation, near Pendleton, Oconee County, S. C., a corporation of Delaware Application November 26, 1951, Serial No. 258,200

9 Claims. (Cl. 28—28)

This invention relates to a beam brake for warp slashers and is an improvement on the invention disclosed in my application, Serial Number 252,681, filed October 23, 1951.

While the brake disclosed in the above-identified application operates quite satisfactorily under most conditions, it was found that where an extremely critical control of tension in the creel was desirable, it was difficult to maintain such tension because of the variations in friction in the bearings rotatably supporting the gudgeon of the section beam. That is to say, that if the bearing friction varied from beam to beam, the over-all friction would not be constant, even though a constant amount of braking friction was added thereto.

It was also found that after a set of section beams had run out, the difficulty of removing the empty beams and replacing them with full ones was materially increased by reason of having to disconnect and open the brake shoes in order to replace the empty beam and then reconnect the shoes and adjust them to their normal running position.

Furthermore, it was discovered that it was not possible to equip all section beams with anti-friction bearings because of the journals or gudgeons of many of the beams being bent or the surfaces thereof being worn or scarred.

It is, therefore, an object of this invention to provide warp slashers with a brake bearing unit applicable even to section beams, the gudgeons of which are worn, scarred or bent out of true.

Another object of this invention is to provide slashers with a brake-bearing unit which does not have to be removed or disconnected from an empty section beam to permit replacement thereof.

A further object of this invention is to provide a composite gudgeon support-brake unit which fits over the gudgeon of a section beam and is easily removable therefrom.

Additional and further objects and advantages will be apparent from the following detailed description, when read in connection with the drawings, in which.

In general, my invention contemplates the provision of self-aligning housings or gimbals pivotally supported by the conventional slide members normally found on the creel-posts of a warp slasher, needle bearings being press-fitted in the housings. Supported by these bearings are the journals or gudgeons of a section beam, each of which is provided with a sleeve. Integral with the sleeve on one side of the beam and intermediate the housing and the face of the beam is a collar which is encompassed by a pair of brake shoes spring-loaded together, one of the shoes being held against rotation by a pair of lugs projecting from the housing. Slidably mounted on the housing adjacent the collar is a rack carrying a finger. Pinned to the housing for rocking movement about its axis is a gear segment having a lever arm integral therewith, the arm being biased to shift the finger through the rack and segment into engagement with the other of the brake shoes to move the shoes together. An air driven piston is so disposed that when the piston is reciprocated, the butt end of the piston rod acts on the lever arm to overcome the force of the biasing spring, moving the finger away from the brake shoe so that the only force urging the shoes together is that of the first-mentioned spring.

Figure 1:
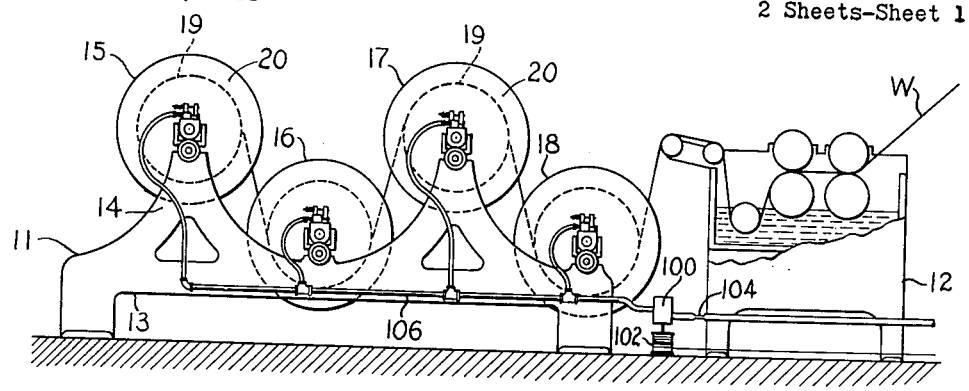
Figure 1 is a side elevation view of a portion of a slasher machine equipped with my invention.
Figure 2:
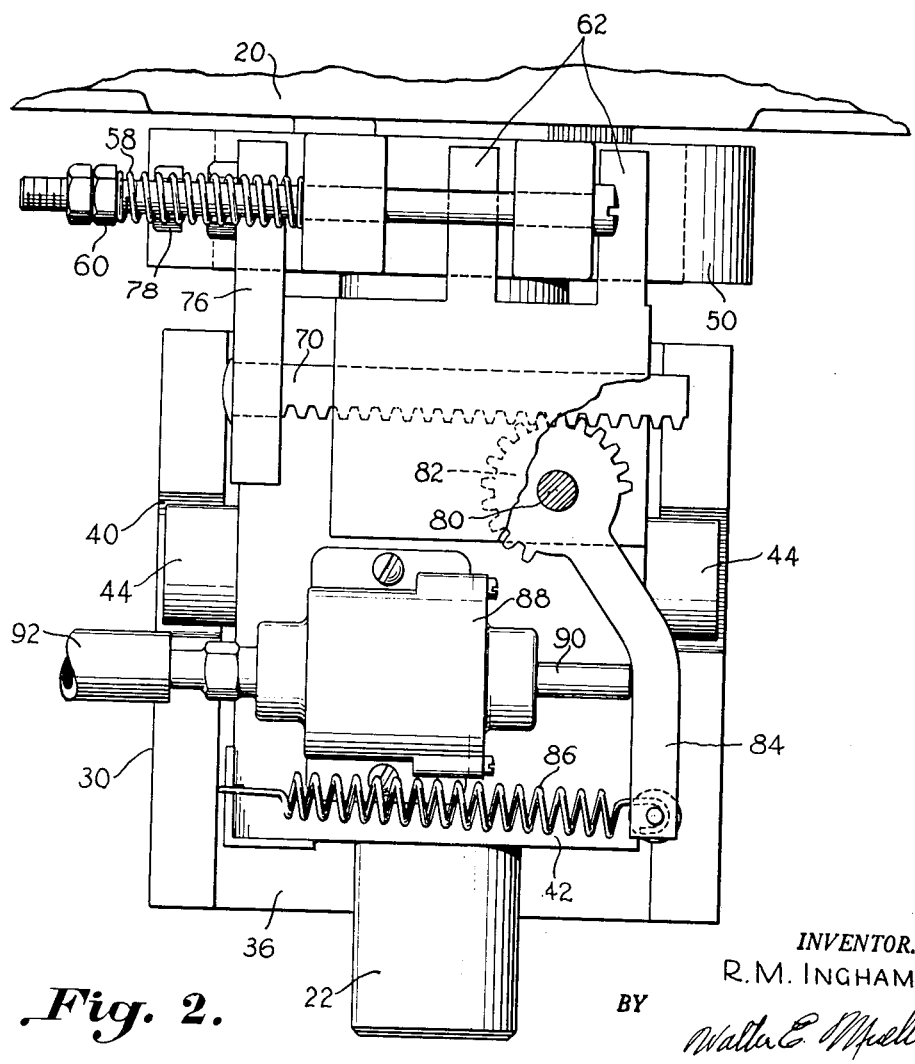
Figure 2 is a detailed plan view of my brake in association with a section beam.
Figure 3:
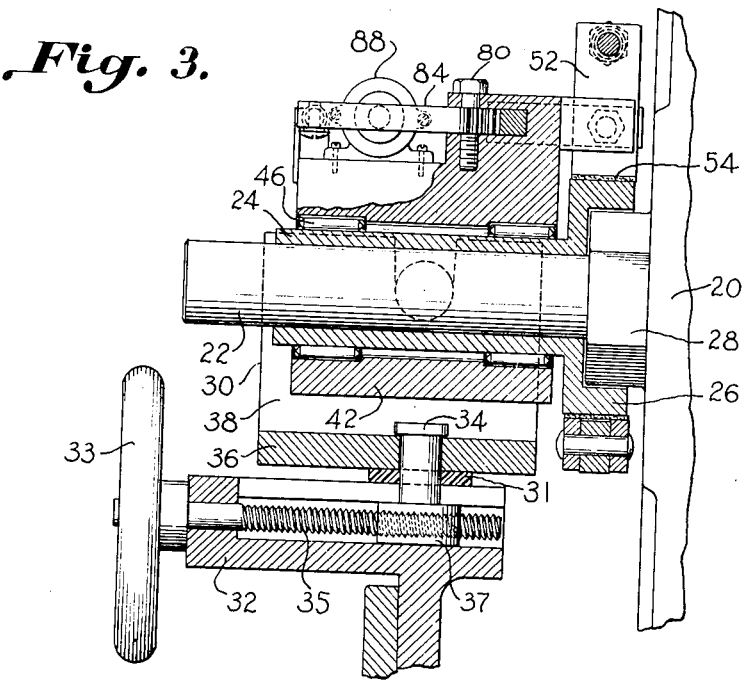
Figure 3 is a side elevation view partially in section of my brake and mounting.
Figure 4:
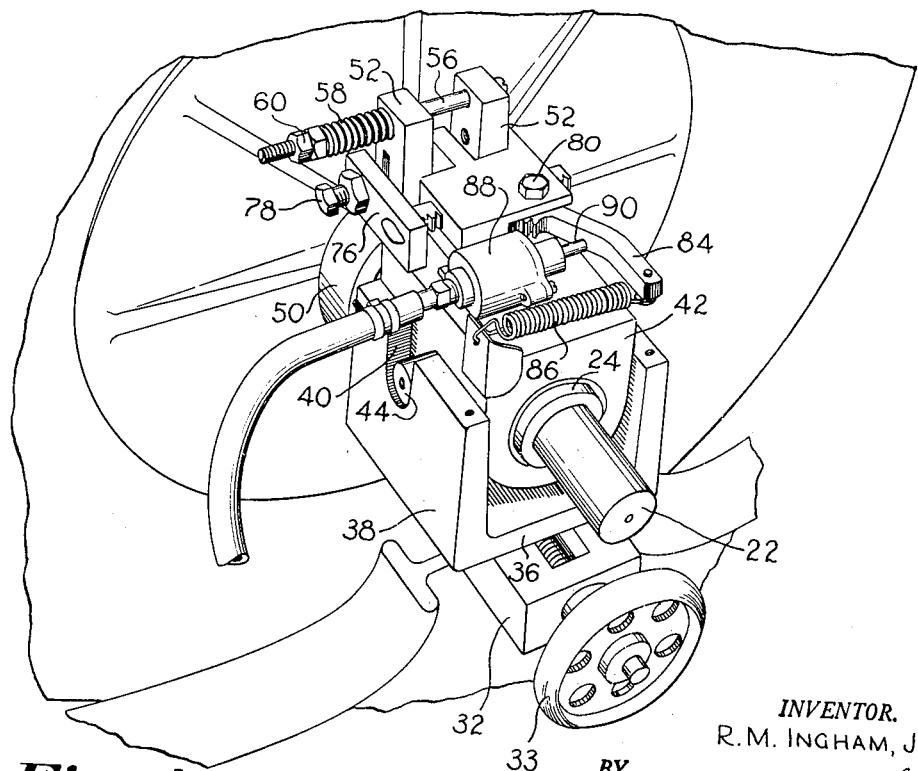
Figure 4 is a perspective view of the brake in operative position.

Referring now to the drawings, Figure 1 shows a slasher of conventional type including a creel 11 and size box 12, the drying cylinders and the remainder of the slasher being not shown since they form no part of the instant invention.

The creel 11 is of the usual construction and comprises a base or frame 13 having the usual standards 14 upstanding therefrom, each standard carrying a slide at the top thereof. The standards 14 are so arranged as to support a plurality of section beams 15—18 in staggered relationship in two tiers, each tier accommodating the same number of beams. Each beam includes a barrel 19 on which the warp threads W have been previously wound. At each end of the barrel 19 is a head or flange 20, from which a journal or gudgeon 22 projects axially. Loosely fitting over each of the gudgeons 22 is a sleeve 24, having a collar 26 on the end thereof contiguous to the face of the section beam flange 20.

Generally, a section beam is held together by hexagonal nuts 28 fitting over the beam gudgeon 22 and screwed up tightly to engage the outer face of the beam flange 20. In order that the sleeve 24 may be in driving engagement with the beam, a hexagonal recess is formed in the face of the collar 26, which recess mates with the nut so that the beam and sleeve rotate as a unit.

A self-aligning housing or gimbal generally designated as 30 is pivotably secured to each slide member 37 by pin 34 projecting downwardly from the base 36 of a channel member 38, a plastic bearing member 31 separating the two. The gimbal is adjustable laterally of the creel-post, a block 37 which supports the pin 34 sliding in a longitudinal recess provided in slide 32, being reciprocated by a screw 35 extending through a threaded aperture in the block, a hand wheel 33 being provided as a convenient means for rotating screw 35. A U-shaped or semi-circular recess 40 is provided in the top marginal portion of each web of the channel member intermediate the ends thereof. Rockably suspended in the channel 38 is a support member 42, substantially U-shaped in cross section, being supported by a pair of diametrically spaced pins 44, projecting laterally from the member, which pins rest in the U-shaped recesses 40. An aperture extends through the member 42 along its longitudinal axis, being somewhat larger in diameter than that of section beam gudgeon 22 in order that a bearing 46 may be inserted therein, as by press-fitting.

The bearing preferably used herein is of the type generally known as "needle bearings," having a number of roller bearings of small diameter secured within a cylindrical outer shell, the unit being of such internal diameter as to be capable of receiving the gudgeon and sleeve of a section beam. While any number of these bearing units may be employed commensurate with the length of the support member, I preferable to use two units on that side of the beam on which the braking device is provided and a single unit on the other side.

My braking device is associated with either side of the beam and consists, in general, of two parts: the braking means per se, and the brake actuating means.

The braking means consists of a pair of semi-circular brake shoes 50 yoked together at one end thereof and having corresponding lugs or ears 52 extending outwardly from the other end thereof, the lugs 52 being spaced slightly apart when the shoes are assembled. The shoes 50 are slightly greater in width than that of the collar 26 and have a lining 54 of well-known friction fabric. When the unit is assembled, the collar 26 is positioned intermediate the housing 30 and the face of the flange 20, being encircled by the shoes with the lugs 52 extending in a vertical direction. The lugs 52, and consequently the brake shoes 50, are spring-biased together, for example, by means of a bolt 56 extending through apertures drilled in the lugs 52, the bolt carrying a spring 58 on that end projecting beyond the lugs, the force of the spring being varied by adjustment of a nut 60 threaded onto the end of the bolt 56.

Obviously, the shoes 50 must be prevented from rotating with the sleeve and beam if braking is to be accomplished and, to this end, I have provided a pair of parallel lugs 62 at the top of the support member 42 and integral therewith, which lugs protrude inwardly from the inner face of the member, on either side of one of the shoes 50, thereby cooperating to render that shoe substantially immovable.

Inasmuch as the width or thickness of the collar 26 and shoes 50 is only from 1 to 2 inches, it is desirable for them to have a diameter at adjacent surfaces of from 3 to 4 inches whereby the heat generated during braking may be effectively dissipated.

The brake actuating means is, for sake of convenience, mounted on the top horizontal surface of the U-shaped support member 42 and consists of a rack and finger, a gear segment and lever and an air cylinder. The rack 70 is horizontally disposed adjacent the lugs 52 of the brake shoes 50 and parallel to the plane of the latter, an end of the rack 70 having affixed thereto a finger or bar 76 extending from the rack to the lugs, the finger carrying a set screw 78 which is adjustable to engage the outer face of the free or movable shoe when the rack 70 is in its unextended position.

Pivotable about its axis 80 and meshing with the rack is a pinion or gear segment 82 having a lever arm 84 integrally attached thereto, a spring 86 being affixed to the end of the arm, biasing the latter to that position at which the rack 70 is unextended. The lever arm 84 is caused to move from the aforesaid position to a second position in which the rack 70 is extended by means of an air cylinder 88. Reciprocating in the cylinder 88 is a piston having a rod 90, the butt end of which engages the arm 84 to move it to the latter-mentioned second position when air is admitted to the cylinder through air hose 92. The piston is, of course, spring-loaded to return to its initial position when the air pressure is removed.

The control system for the braking devices is substantially the same as that shown in connection with my earlier application, heretofore mentioned, and consists of a two-way air valve 100, solenoid 102 and switch, not shown. The valve 100 is so constructed that excitation of the solenoid 102 reciprocates the valve piston to permit air to flow from a reservoir, not shown, through the valve 100 and main air line 106 to air hoses 92 and thence to air cylinders 88; while de-energization of the solenoid allows the valve piston to move under action of its return spring to a position in which line 106 is in communication with the atmosphere, exhausting cylinders 88. Suitable switch means, not shown, are supplied in the line supplying an electric current to solenoid 102, the switch being associated with the control means of the slasher so that it is closed and opened when the slasher is started up and stopped, respectively. For a more detailed description of the valve and solenoid actuating means, reference is made to my earlier filed application, Serial Number 252,681.

An orifice or restriction 104 is provided in the line from a reservoir, not shown, to the inlet port of valve 100 so that compressed air is supplied to the valve at a very low rate to effect a gradual rather than a sudden release of the brake. An orifice having a diameter in the neighborhood of 0.40 inch is quite adequate for this purpose, although it should be obvious that the size of the orifice may be selected to obtain any desired "lag" in release of the brakes.

In operation, assume that the creel 13 is empty, the bearing support member 42, sleeve 24 and brake unit merely resting in the channel supported by the creel-posts. A section beam fully wound with yarn is lifted from the storage area on a traveling hoist, moved to the creel and lowered until it is suspended a few inches above the creel. The bearing support 42, sleeve 24 and brake unit on one side of the beam and the bearing support and sleeve on the other are lifted bodily from their channels, and slipped over the gudgeons 22 of the beam.

The beam is aligned with its supports and lowered into place, the pins 44 on the bearing support member resting in the semi-circular recesses in the webs of the channel members, the full weight of the beam being supported thereby. The hoisting apparatus is then removed and the hand wheels 33 turned, rotating screw 35 and moving the channels laterally of the creel until the recess in the inner face of each collar 26 is engaged by the nut 28 of the beam.

As the shifter handle, not shown, is moved to its "slow" position, the operation of the slasher is commenced, the warp W moving at about 2 yards per minute; the brakes, however, are not released at "slow" speed for the reason that the sudden application of torque to the beam when the slasher is started would tend to cause overrunning if rotation of the beam were not retarded.

The speed is then increased to normal running speed of about 30 to 40 yards per minute, the movement of the shifter bar to its "fast" position closing a switch to energize solenoid 102 to permit air to flow to cylinders 88.

The air thus admitted to the cylinders 88 moves the rod 90 until it engages lever 84 and rocks it and segment 82 about the axis of the latter against the force of springs 86 and 58. This moves the rack 70 to its extended position at which the setscrew 78 carried by finger 76 is displaced from one of the brake shoes 50 so that they are no longer urged together by spring 86, being now biased only by spring 58, thereby applying only enough torque to gudgeon 22 of the beam to maintain the warp at the proper running tension.

It should be apparent that the magnitude of the running torque is proportionate to the strength of spring 58 and that this spring should be selected with this factor in mind. I have found that if the force of this spring is adjusted to apply a torque of 2 to 3 foot-pounds to the beam when the slasher is running at normal speed, the running tension in the warp will be maintained at a satisfactory level.

The stopping force is commensurate with the strength of spring 86 and while this spring may be selected so as to halt the rotation of the beam in any desired period of time, I have found that a spring having that force necessary to apply a torque of 9 to 11 foot pounds to the beam is sufficient to stop the beam.

The choice of particular springs necessary to give the above torques will depend in some measure on the mechanical advantage of the levers. If a larger mechanical advantage is employed, a smaller spring can be utilized and vice versa. I prefer that the rack lever furnish an effective advantage of about 4 to 1.

Notwithstanding the fact that I have shown my invention in association with a machine suitable for slashing cotton warp, I do not intend that its use is limited thereto and I consider it obvious that my invention is capable of being modified for use with slashers of other types.

It is to be understood that the description hereinabove is illustrative and that changes and variations may be

What is claimed is:

1. A braking device for section beams of a warp slasher including a creel having a base, creel-posts upstanding from said base, and a slide member mounted at the top of each of said posts for limited sliding movement transversely of the creel, comprising a self-aligning housing pinned to said slide member, bearings carried by said housing, a sleeve loosely encircling the gudgeon of a section beam in driving engagement with said beam and being received within said housing and bearings, said sleeve having a collar thereon intermediate said housing and the face of said section beam, a pair of brake shoes embracing said collar, being pivotably connected together at one end thereof, each shoe having a lug at its free end, spring means carried by said lugs for urging said shoes together, means carried by said housing for preventing movement of one of said shoes, a rack sliding on said housing and engaging the other of said shoes, a gear segment meshing with said rack, being pivotable about its axis, spring means tending to pivot said segment to move said shoes together, means operable to overcome the force of said last-named spring means, and control means responsive to the control mechanism of the slasher to operate said operable means when said slasher is started up and to release said means when the slasher is slowed or stopped to permit said brake shoes to move together under the influence of said spring means.

2. In a brake for section beams of warp slashers including a control mechanism and a creel having creel-posts supporting at least one section beam, the combination of self-aligning housings mounted on said creel-posts, anti-friction bearings within said housings, the journals of said beam being supported by said bearings, a sleeve being provided on the journal at one end of said beam between said journal and said bearings, braking means encircling said sleeve intermediate said housing and the face of said beam, detent means on said housing restraining said braking means against rotation, spring means carried by said braking means urging said braking means into engagement with said sleeve, spring means carried by said housing normally urging said braking means into engagement with said sleeve, and means carried by said housing operable to overcome the force of said housing spring means, said last-named means being operated in response to the action of the control mechanism of the slasher.

3. The device as in claim 2 wherein a collar in provided at the end of said sleeve intermediate said housing and the face of said beam, being encircled by said braking means.

4. The combination with a slasher having means for supporting at least one section beam and control means therefor of: self-aligning means for rotatably receiving at least a portion of the journals of said beam, means separable from said self-aligning means for applying a braking force to restrain rotation of said beam, means for preventing free rotation of said separable means with said beam, a first means associated with said separable means and urging the same into braking engagement with said journal, a second means associated with said self-aligning means and urging the separable means into engagement with said journal, and means associated with said self-aligning means for relieving said second means when said control means is positioned for reducing the rate of operation of the slasher.

5. The combination with a slasher having section beam supporting means and a control mechanism of: self-aligning housings mounted on said supporting means and adapted to partially receive for rotation the journals of said beams, braking means encircling at least one journal of each of said beams, said braking means being restrained against rotation, spring means for urging said braking means into braking engagement with said journal and means carried by said housing operable to partially relieve said spring means when said control means is positioned for reducing the rate of operation of the slasher.

6. The combination with a slasher having means for supporting at least one section beam of: self-aligning means mounted on said supporting means for rotatably receiving the journals of said beam, braking means for said beam, means normally urging said braking means into braking engagement with said beam and means associated with said self aligning means automatically operable to overcome in part the force of said urging means.

7. The combination as in claim 6 wherein said last-named means is actuated in response to movement of the control means for starting and stopping the slasher.

8. A support-brake assembly for reels having end shafts, comprising supporting means, self-aligning means mounted on said supporting means for rotatably receiving the end shafts of a said reel, braking means for said reel, means normally urging said braking means into braking engagement with said reel, and means associated with said self-aligning means automatically operable to overcome in part the force of said urging means.

9. The combination according to claim 8, wherein there is provided material moving means spaced from said reel and speed control means for said material moving means, said means associated with said self-aligning means being actuated in response to actuation of said control means.

References Cited in the file of this patent

UNITED STATES PATENTS

| Number | Name | Date |
|---|---|---|
| 786,315 | Rogers | Apr. 5, 1905 |
| 870,945 | Floyd | Nov. 12, 1907 |
| 1,491,200 | Cline | Apr. 22, 1924 |
| 1,528,966 | Berger | Mar. 10, 1925 |
| 1,536,047 | Arnold | May 5, 1925 |
| 1,574,724 | Zahn | Feb. 23, 1926 |
| 1,733,834 | Steele | Oct. 29, 1929 |
| 1,838,615 | Greve | Dec. 29, 1931 |
| 1,859,301 | Lamatsch | May 24, 1932 |
| 2,017,068 | Lamatsch | Oct. 15, 1935 |
| 2,085,040 | Post | June 29, 1937 |
| 2,187,181 | Shackelford | Jan. 16, 1940 |
| 2,340,921 | Benoit | Feb. 8, 1944 |
| 2,525,461 | Schnell | Oct. 10, 1950 |
| 2,546,141 | Bauer | Mar. 27, 1951 |
| 2,645,838 | Lambach | July 21, 1953 |

FOREIGN PATENTS

| 465,879 | Great Britain | May 18, 1937 |